Patented May 20, 1952

2,597,439

UNITED STATES PATENT OFFICE 2,597,439

WEAKLY BASIC ANION-EXCHANGE POLYMERS

George W. Bodamer, Cheltenham, Pa., assignor to Rohm & Haas Company, Philadelphia, Pa., a corporation of Delaware No Drawing. Application May 12, 1951, Serial No. 226,093

7 Claims. (Cl. 260—85.1)

This invention relates to anion-exchange polymers and to their preparation and use. It relates to insoluble anion-exchange resins of the weakly basic type which are proliferous polymers and which are characterized by unusually large areas of surface, very high degrees of porosity, high adsorptive capacity, and very rapid rates of adsorption. More specifically it relates to the preparation and use of polymers which have the chemical properties of weakly basic anion-exchangers and the physical properties of the so-called popcorn or proliferous polymers. As as result of this peculiar combination of chemical and physical properties, these ion-exchange resins have distinct advantages in some applications over the harder and denser weakly basic anion-exchangers employed heretofore. They are particularly suitable for use in catalysts, in peptic ulcer therapy, and in decolorization of beet sugar syrups because of their high surface areas and their very rapid rate of adsorption of acids.

Other anion-exchange resins of the weakly basic type are well known and are marketed in large volumes for the deionization of aqueous fluids in general. Such resins as are being currently used are described, for example, in U. S. Patent No. 2,356,151 and in C. H. McBurney's United States application Serial No. 759,309, filed July 5, 1947, now Patent No. 2,591,574, and are characterized by being hard, dense, infusible, insoluble, granular or spheroidal particles. As far as the chemical properties of these known resins and the chemistry of ion-exchange are concerned, the available products are very satisfactory. But the physical properties of these materials—particularly their hard, dense, granular form—limits their utility in many instances where their chemical properties would appear to make them ideally suited.

For example, it has been found that the proliferous products of this invention decolorize beet sugar solutions much more rapidly and efficiently than do the older kind of dense resins even though the new and the older resins contain the same kind and number of amino groups. Furthermore, because these new resins have such rapid rates of adsorption, they are eminently suitable for peptic ulcer therapy. And yet, despite their greater bulkiness, they can be used like the older resins in the customary column operation for the deionization of fluids in general.

The products of this invention are all insoluble, proliferous or popcorn polymers. They are water-insoluble, proliferous polymers of styrene, to the aryl nuclei of which are attached amino groups. The amino groups are attached to the aromatic nuclei by means of alkylene groups—preferably by methylene groups. These polymers are made, as will be described in greater detail below, by haloalkylating—preferably chloromethylating—an insoluble proliferous polymer or copolymer of styrene and then reacting the haloalkylated, proliferous product with a primary or secondary amine. As a result, the products are insoluble, proliferous polymers which are suitable for the removal of anions from fluids and which comprise the reaction product of an amine and a haloalkylated, proliferous copolymer of a major proportion of styrene and a minor amount of a polyolefinic compound— such as divinylbenzene, butadiene, or isoprene— in which the olefinic linkages are in the acyclic portion of the molecule and are the reactive groups which enter into the proliferous copolymerization reaction, said proliferous copolymer containing an average of 0.2 to 1.5 haloalkyl groups per aromatic nucleus and the amine being either a primary or a secondary amine.

Popcorn polymers of styrene are known. Their formation was first reported by Staudinger and Husemann in their study of the polymers and copolymers of styrene (Berichte, 68, 1618 (1935)). They are also described in U. S. Patents Nos. 2,205,390; 2,290,164, 2,311,615; 2,331,263, and 2,341,175. While mixtures of popcorn polystyrene and normal, glass-like, thermoplastic polystyrene can be molded, the operation is much more difficult than the molding of the thermoplastic polystyrene alone, as indicated in U. S. Patent No. 2,537,951. Aside from molding, the popcorn polymers of styrene apparently had no utility heretofore. The popcorn polymers and copolymers of styrene have a spongy, porous structure and are insoluble in the very solvents which dissolve the homogeneous, thermoplastic, glass-like polymers which are normally produced. In most cases they do look very much like popcorn. They have very high molecular weights and appear to be cross-linked. In the process of forming popcorn polystyrene, the induction period may be long, but soon after a particle of the polymer is formed or is added, the rate of polymerization increases rapidly and the branching, insoluble polymer continues to form until most or all of the monomer is consumed. This is usually referred to as "popping." It is a characteristic of this type of polymerization that the polymer "grows" in much the same way as a salt crystal "grows" when a salt solution is concentrated. If the product is not confined or restrained physically, polymerization proceeds in random directions with the formation of a branched or clustered, expanded or "popped" product. That is, polymerization progresses by proliferation with the rapid and repeated production of new parts; and for this reason the term "proliferous polymer," which has been applied to this kind of polymer and which is now synonymous with "popcorn polymer" is particularly apt—and is truly descriptive.

In preparing the proliferous polystyrene from which the products of this invention are made, the most satisfactory method comprises holding a mixture of styrene and an auxiliary polyolefinic popping-agent at a temperature from room temperature (20° C.) to about 80° C., in the presence of a seed of a proliferous polymer, while excluding oxygen.

In general, polymerization progresses more rapidly as the temperature is raised but at temperatures above about 80° C. the proliferous polymer is usually mixed with an objectionable amount of the normal, glass-like polymer and consequently temperatures from about 50° C. to about 70° C. are preferred and recommended.

A wide variety of polyolefinic compounds definitely assist in the formation of the proliferous polystyrene. These auxiliary materials which function as popping-agents or as catalysts for proliferous polymerization are all polyolefinic compounds in which the olefinic linkages are in the acyclic portion of the molecule and are the reactive groups which enter into the proliferous copolymerization reaction. Since this invention is concerned primarily with the manufacture of anion-exchange resins and only indirectly with the many ways in which popcorn polystyrene can be made, it is not intended to be limited or restricted by the particular auxiliary compound or popping-agent which is used to assist in preparing the intermediate popcorn polystyrene. While numerous polyolefinic materials act as popping-agents, examples of some of the best include divinylbenzene, butadiene, isoprene, bimethallyl, biallyl, trivinylbenzene, cyclopentadiene, and similar polyolefinic hydrocarbons. Also effective are other unsaturated compounds such as dimethallyl ether and sulfide, vinyl allyl ether and those unsaturated esters, such as diallyl maleate and 2-chloroallyl crotonate, which are disclosed in United States Patents Nos. 2,311,615 and 2,341,175. The auxiliary compounds give every evidence of copolymerizing with the styrene and consequently are present in the final copolymeric products. This is one reason why the polyolefinic hydrocarbons are preferred. It is evident that as the amount of the auxiliary compound is increased the number of styrene nuclei which can be reacted is necessarily reduced. And since the capacity of the final resin for adsorbing anions is proportional to the number of amino groups which are attached to the aromatic nuclei in the product, it is desirable to hold the amount of the copolymerizable auxiliary compound to a minimum. On the other hand, the use of a polyolefinic compound does exert a beneficial effect on the speed of polymerization and on the character and uniformity of the product. The use of as little as 0.5% of an auxiliary compound is evident in the results which obtain. The most satisfactory and suggested amounts, however, are from 2% to 30%, based on the total weight of this compound and the styrene. The use of larger amounts has been studied but there does not appear to be any advantage in exceeding 30%—or even 20%—particularly when the ion-adsorbing capacity of the final product is considered. While all of the auxiliary compounds are alike in having a plurality of non-benzenoid, olefinic linkages or double bonds in their chemical structure, and in facilitating the popping of styrene, it is also true that these compounds differ in degree in regard to the effect they have on the density and porosity of the final copolymer. For example, a material such as divinylbenzene, which is recognized as a particularly fast and efficient cross-linking agent for styrene and vinyl compounds in general, aids very materially in the popping of styrene, but it also gives rise to harder, less porous, popcorn polymers than do many of the other auxiliary agents such as butadiene or isoprene. Consequently the amount, within the limits set forth above, of the auxiliary, copolymerizable compound which is employed is determined by the degree of porosity or extent of surface-area which is desired in the final product.

The use of a seed to promote the proliferous polymerization is desirable but not necessary. The seed can have the same chemical composition as the proliferous polymer which it is desired to make, or it can have a different chemical composition. The most convenient method involves adding a small amount of a previous batch of proliferous polymer to subsequent mixtures of monomeric styrene which are to be popped. Even the small quantities of one batch which may adhere to the walls of the reaction vessel serve to seed subsequent batches. The word "seed" is used herein in the accepted chemical sense and itself indicates that the amount required is small and that the material is insoluble in the reaction mixture. As little as about 0.001%, on a weight basis, is adequate. Of course, when the seed and the polymer being prepared have the same chemical composition, the amount of the seeding material which is employed is immaterial.

Styrene can be made to polymerize proliferously in bulk or in solution or while suspended in an immiscible liquid medium. The advantage in carrying out the polymerization by the suspension technique is that the final product is obtained in the form of discrete particles which adsorb ions unusually rapidly and which, although small, possess the advantageous properties of popcorn polymers, such as porosity, high surface-area, and insolubility.

It appears that free radicals, such as are provided by peroxidic compounds, play a part in the formation of the opaque, proliferous polymers, just as they do in the formation of clear, glass-like polymers. In proliferous polymerization, however, the amounts of the peroxidic compounds, such as benzoyl, lauroyl, and stearoyl peroxides, tert.-butyl hydroperoxide and the inorganic per-salts, which can be tolerated is relatively very low and should not exceed 0.5% on a weight basis because large amounts of such compounds favor the formation of the clear, glass-like polymers at the expense of the opaque, proliferous polymers. In like manner, a steady and continuous source of oxygen is to be avoided. That is to say, oxygen should be eliminated and, although the amount of air which is normally present in a closed reaction vessel is not too objectionable, it can be replaced to good advantage by an inert gas such as nitrogen. Thus, it is most desirable to conduct the proliferous polymerization in the substantially complete absence of oxygen.

The proliferous polymers and copolymers of styrene are first haloalkylated and then reacted with a primary or secondary amine. This step of haloalkylating involves introducing into a proliferous polymer a plurality of bromoalkyl or, preferably, chloroalkyl groups having the general formula $C_nH_{2n}X$, in which $n$ is an integer of value 1 to 4 and X represents an atom of chlorine or bromine. While groups containing one to four carbon atoms are embraced by this invention, it is preferred to employ those compounds in which chloromethyl groups, —$CH_2Cl$, are added to the insoluble polymer, because the chloromethyl products are by far the most reactive. The carbon atoms in the group

$$—C_nH_{2n}X$$

may be in a straight or a branched chain.

The step of haloalkylating the insoluble hydrocarbon copolymer may be carried out in a variety of ways. For example, the polymer may be reacted with a mixture of an aldehyde and hydrochloric acid or a mixture of a dihalide and a Friedel-Crafts catalyst. Methods of chloroalkylating which may be used for introducing the —$CH_2Cl$ group and which also serve as guides for introducing —$C_2H_4X$, —$C_3H_6X$, and —$C_4H_8X$ groups are described in "Organic Reactions," vol. I, chapter 3, page 63 et seq. (John Wiley & Sons, Inc., New York city, 1942).

The extent of the haloalkylation reaction may be conveniently determined by a halogen analysis. It is desirable that as many haloalkyl groups as possible be introduced into the insoluble copolymer because the number of such groups determines the number of molecules of the amine which may be subsequently introduced into the resin molecule; and, of necessity, the number of molecules of amine thus introduced determines the ultimate capacity of the resin to adsorb anions. Although resins containing relatively few amino groups have some capacity for adsorbing anions, it is necessary from a practical standpoint to add a large number of such groups in order to produce a resin of sufficiently high capacity as to be commercially attractive. And since, as stated, the number of molecules of amine which can react is determined largely by the number of haloalkyl substituents in the resin molecule, it is important that the minimum number of such substituent haloalkyl groups should be one for every fifteen hydrocarbon nuclei. In the case of a chloromethylated copolymer of styrene and 1% divinylbenzene, such a product would analyze about 2% chlorine. The upper limit is reached when every available position in the aromatic nuclei is haloalkylated. Satisfactory resins of high capacity can be made in which the number of haloalkyl groups, and hence the number of molecules of reacted amine which are introduced, is less than the theoretical maximum. Thus, very valuable resins are those made by aminating copolymers containing from three to six haloalkyl groups for every four aromatic hydrocarbon nuclei.

The next step in the formation of the anion-exchange resin is the amination of the haloalkylated copolymer with a primary and/or a secondary amine. This reaction is preferably carried out by adding the amine to the haloalkylated polymer while the latter is suspended and agitated in a liquid which is a solvent for the amine. The mixture may be allowed to react at room temperature or, preferably, at elevated temperatures, after which the resin, containing amino groups, is freed from the liquid.

It has been found to be advantageous to swell the haloalkylated polymer prior to its reaction with the amine. This swelling facilitates the subsequent amination reaction and may be carried out by soaking the polymer in a suitable liquid, the most common of which are aromatic hydrocarbons such as benzene and toluene. Frequently, the volume of the polymer will increase as much as 100%, although the amount of swelling depends to a great extent upon the amount of cross-linking which has taken place during the preparation of the original polymer. In general, the amount of swelling is inversely proportional to the degree of cross-linking.

The amines which are employed are used in the form of the free base. The prime requirement is that they contain at least one amino-nitrogen atom to which is attached one or two reactive hydrogen atoms. The amines which are preferred in this application are those which are primary or secondary and in which the amino group or groups are attached to a hydrocarbon group. Other amines may be used, however, including those wherein the hydrocarbon group of the amine carries a substituent group. Such amines may be exemplified by ethanolamine and diethanolamine. For best results, the amino compound should not contain substituent groups which are themselves reactive under the conditions employed in aminating the haloalkylated resin.

As stated, the preferred amines are those in which the amino-nitrogen atom is attached to one or two unsubstituted hydrocarbon groups. Primary and secondary amines are operable, as well as mixtures of the two types, and polyamines, including those having primary and secondary amino groups such as polyalkylene polyamines. The hydrocarbon portion of the amine may be aliphatic, aromatic, cycloaliphatic, araliphatic, and alkaromatic. The following typify those amines which are all suitable in this invention when used individually or in mixtures with one another: Methylamine, dimethylamine, n-butylamine, iso-butylamines, dibutylamines, aniline, benzidine o-, m-, and p-toluidines, xylidines, alpha- and beta-naphthylamine, naphthalene diamines, benzylamine, dibenzylamine, phenylene diamine, benzyl aniline, benzyl ethylamine, methyl aniline, cyclohexylamine, dicyclohexylamine, diethylene triamine, triethylene tetramine, tetraethylene pentamine, 3,3'-iminobispropylamine, and propylene diamine.

The following examples in which all parts are by weight are presented in order that the preparation and properties of the products of this invention may be thoroughly understood and recognized. The examples, which are illustrative, are not to be taken, however, as limiting this invention.

EXAMPLE 1

This serves to show how styrene can be conveniently converted into proliferous or popcorn polymers in bulk. In all cases a glass tube was half-filled with the styrene mixture to be popped. A small piece—a seed—of a previously prepared proliferous copolymer of approximately 90% styrene, 4.4% divinylbenzene, and 5.6% ethyl styrene was added. The mixtures contained a major portion of styrene and a minor portion of a polyolefinic auxiliary compound, as a popping-agent, which was known to be copolymerizable with the styrene. Nitrogen was bubbled through the mixtures in order to flush oxygen from the tubes and thereafter the tubes were sealed with a foil-lined cap and were placed in a constant-temperature water bath. The kind and amount of the auxiliary popping-agent which copolymerized proliferously with the styrene are listed below, together with other pertinent data. The percentages are based on the total weight of the copolymerizable mixtures. An induction period as recorded is that length of time during which no visible change takes place in the monomeric mixture and is followed by a period of propagation during which the polymer is formed on the seed by proliferation. Ordinarily, the induction period is several times as long as the period of propagation.

*Table I*

| Polyolefinic Auxiliary Compound | Per Cent Benzoyl Peroxide | Temperature | Induction Period |
|---|---|---|---|
| 10% Butadiene | 0 | Room Temp | About 8–10 days. |
| Do | 0 | 50° C | About 5–7 days. |
| Do | 0.1 | 65° C | 1–1½ days. |
| 10% Isoprene | 0 | Room Temp | About 10–12 days. |
| 10% Butadiene and 5% Commercial Divinylbenzene.[1] | 0 | do | About 6–8 days. |
| 5% Commercial Divinylbenzene. | 0 | do | About 8–10 days. |
| Do | 0 | 100° C | About 16 hours.[2] |

[1] The commercial divinylbenzene contained approximately 44% divinylbenzene and 56% ethylstyrene.
[2] This product was approximately 50% proliferous polymer and 50% glass-like polymer. The two polymers could be separated however.

EXAMPLE 2

A proliferous copolymer of 90% styrene and 10% butadiene was chloromethylated as follows: 90 parts (0.75 mole) of the copolymer (the first described in Example 1 above) was soaked in 1480 parts of ethylene dichloride for two hours during which time the polymer swelled markedly. To the mixture contained in a 3-necked flask equipped with stirrer, thermometer, and reflux condenser was added 138 parts (1.73 moles) of chloromethyl ether, $CH_2ClOCH_3$, and 63.5 parts (0.475 mole) of anhydrous aluminum chloride. The mixture was stirred at room temperature for 18 hrs. after which 1500 parts of water was added and the mixture was stirred for two hours. The resin was filtered off and was thoroughly washed with water, after which it was dried in an oven overnight at 65° C. Analysis showed that the product contained 11.7% chlorine and inspection revealed that the chloromethylated material was still in the form of a popcorn or proliferous polymer.

EXAMPLE 3

The chloromethylated proliferous product of Example 2 was aminated as follows: In a 3-necked flask equipped with stirrer, thermometer, and reflux condenser was mixed 140 parts of toluene and 32.8 parts of the dry chloromethylated product of Example 2 (equivalent to 0.1 mole of $-CH_2Cl$ groups). The mixture was stirred for an hour during which time the polymer swelled. Then, 58.5 parts (1.3 moles) of dimethylamine was added and the mixture was stirred at room temperature for 16 hours. The resultant reaction mixture was next filtered and the resinous product was washed with water and then stripped of toluene and amine by steam distillation. The final product was separated and dried. When tested with a standard solution of hydrochloric acid it was found to have a capacity of 2.57 milliequivalents for each gram of dry resin and had the same general physical structure as the original proliferous styrene copolymer and chloromethylated copolymer from which is was prepared.

EXAMPLE 4

This example illustrates the method of aminating a chloromethylated popcorn polymer by means of a polyalkylene polyamine. The general process of Example 3 was followed and 37.8 parts of the chloromethylated product of Example 2 was first swollen in toluene as described above. Then 64 parts of diethylenetriamine (0.62 mole) was added and this mixture was stirred at room temperature for 16 hours after which the polymeric product was purified by the process of Example 3. Forty and one-half parts of a dried product was obtained which had a capacity of 3.91 milliequivalents for each gram of dry resin and was obviously a popcorn polymer.

The method described in Examples 2, 3, and 4 above was followed in the preparation of a wide variety of proliferous polymers having ion-exchange properties by chloromethylating the other proliferous styrene polymers of Example 1 above and then aminating the chloromethylated products with such amines as dimethylamine, ethylamine, and triethylenetetramine. All of the products retained the general physical properties of the popcorn styrene copolymers from which they were made.

The products of this invention are all members of that class of compounds known as weakly basic anion-exchange resins. Thus, they do adsorb acids from fluids but are not capable of splitting neutral salts such as sodium chloride. For the latter purpose a strongly basic anion-exchange resin is necessary such as the proliferous polymers of styrene which contain quaternary ammonium groups and which are described in another of my applications, Serial No. 226,094, filed May 12, 1951.

I claim:

1. A process for preparing solid, water-insoluble, anion-exchange resins which comprises proliferously polymerizing styrene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to at least one chloromethyl group for every fifteen aromatic nuclei in said proliferous polymer, reacting the resultant chloromethylated proliferous polymer with an amine from the class consisting of primary and secondary amines, and thereafter isolating the resultant anion-exchange resin.

2. A process for preparing solid, water-insoluble, anion-exchange resins which comprises proliferously polymerizing a mixture of (a) styrene and (b) a polyolefinic organic compound of which the olefinic linkages are in the acyclic portion of the molecule and are the reactive groups which enter into the copolymerization reaction, said mixture containing at least 70% styrene, at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to at least one chloromethyl group for every fifteen aromatic nuclei in said proliferous polymer, reacting the resultant chloromethylated proliferous polymer with an amine from the class consisting of primary and secondary amines, and thereafter isolating the resultant anion-exchange resin.

3. A process for preparing solid, water-insoluble, anion-exchange resins which comprises proliferously polymerizing a mixture of (a) 70–99.5% styrene and (b) 0.5–30% divinylbenzene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to 3 to 6 chloromethyl groups for every four aromatic nuclei in said proliferous polymer, reacting the resultant chloromethylated proliferous polymer with diethylenetriamine, and thereafter isolating the resultant anion-exchange resin.

4. A process for preparing solid, water-insoluble, anion-exchange resins which comprises proliferously polymerizing a mixture of (a) 70–99.5% styrene and (b) 0.5–30% butadiene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to 3 to 6 chloromethyl groups for every four aromatic nuclei in said proliferous polymer, reacting the resultant chloromethylated proliferous polymer with diethylenetriamine, and thereafter isolating the resultant anion-exchange resin.

5. A process for preparing solid, water-insoluble, anion-exchange resins which comprises proliferously polymerizing a mixture of (a) 70–99.5% styrene and (b) 0.5–30% isoprene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to 3 to 6 chloromethyl groups for every four aromatic nuclei in said proliferous polymer, reacting the resultant chloromethylated proliferous polymer with diethylenetriamine, and thereafter isolating the resultant anion-exchange resin.

6. A process for preparing solid, water-insoluble, anion-exchange resins which comprises proliferously polymerizing a mixture of (a) 70–99.5% styrene and (b) 0.5–30% divinylbenzene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to 3 to 6 chloromethyl groups for every four aromatic nuclei in said proliferous polymer, reacting the resultant chloromethylated proliferous polymer with dimethylamine, and thereafter isolating the resultant anion-exchange resin.

7. A process for preparing solid, water-insoluble, anion-exchange resins which comprises proliferously polymerizing a mixture of (a) 70–99.5% styrene and (b) 0.5–30% butadiene at a temperature from about 20° C. to about 80° C. in the substantially complete absence of oxygen and in the presence of a seed of a previously prepared proliferous polymer, then chloromethylating the resultant proliferous polymer whereby chloromethyl groups are attached to the aromatic nuclei in an amount equal to 3 to 6 chloromethyl groups for every four aromatic nuclei in said proliferous polymer, reacting the resultant chloromethylated proliferous polymer with dimethylamine, and thereafter isolating the resultant anion-exchange resin.

GEORGE W. BODAMER.

REFERENCES CITED

The following references are of record in the file of this patent:

UNITED STATES PATENTS

| Number | Name | Date |
|---|---|---|
| 2,311,615 | Zemba | Feb. 16, 1943 |
| 2,537,951 | Amos | Jan. 16, 1951 |

OTHER REFERENCES

Kharasch, Ind. and Eng. Chem., July 1947, pp. 830–837.

Staudinger, Berichte, vol. 68, pp. 1618–1934 (1935).

Kunin, Ion Exchange Resins (1950), p. 61, John Wiley & Sons, N. Y.